United States Patent [19]
Liao et al.

[11] Patent Number: 5,546,430
[45] Date of Patent: Aug. 13, 1996

[54] DETECTOR FOR DEMODULATING A RECEIVED SIGNAL AND PRODUCING AN INFORMATION DATA SIGNAL WITH REDUCED INTERSYMBOL INTERFERENCE

[75] Inventors: Ke-Qiang Liao, Hull; Yonghai Gu, Nepean, both of Canada

[73] Assignee: Université du Québec à Hull, Hull, Canada

[21] Appl. No.: 432,920

[22] Filed: May 1, 1995

[51] Int. Cl.$^6$ .................................................. H04L 27/06
[52] U.S. Cl. .......................... 375/341; 375/340; 375/233; 375/234; 375/348
[58] Field of Search .................................. 375/230, 348, 375/232, 233, 340, 341, 265; 364/724.2

[56] References Cited

U.S. PATENT DOCUMENTS

| | | | |
|---|---|---|---|
| 4,905,254 | 2/1990 | Bergmans | 375/14 |
| 4,953,183 | 8/1990 | Bergmans et al. | 375/101 |
| 5,031,195 | 7/1991 | Chevillat et al. | 375/14 |
| 5,052,000 | 9/1981 | Wang et al. | 371/43 |
| 5,056,117 | 10/1991 | Gitlin et al. | 375/341 |
| 5,157,690 | 10/1992 | Buttle | 375/14 |
| 5,159,610 | 10/1992 | Eyuboglu et al. | 375/18 |
| 5,263,033 | 11/1993 | Seshadri | 371/43 |
| 5,301,167 | 4/1994 | Proakis et al. | 367/134 |
| 5,303,264 | 4/1994 | Ohsawa | 375/12 |
| 5,321,723 | 6/1994 | Mizoguchi | 375/233 |
| 5,414,733 | 5/1995 | Turner | 375/233 |

OTHER PUBLICATIONS

Adaptive Equalization, Shahid U. H. Qureshi, Senior Member, IEEE, vol. 73, Sep. 1985.
Adaptive Receiver for Data Transmission over Time-Dispersive Channels, Shahid U. H. Qureshi and Edmunde E. Newhall, IEEE Transactions on Information Theory, Jul. 1973.
Adaptive Channel Memory Truncation for Maximum Likelihood Sequence Estimation, D. D. Falconer and F. R. Magee, Jr., The Bell System Technical Journal, Nov. 1973.
A Maximum-Likelihood Sequence Estimator with Decision-Feedback Equalization, Won U. Lee and F. S. Hill, Jr., IEEE Transactions on Communications, vol. Com-25, No. 9, Sep. 1977.

Adaptive Decision Feedback Equalization with MLSE Based on Predicted Signals, Yonghai Gu, Tho Le-Ngoc and Shixin Cheng, IEEE, 1993.
Digital Communications, John G. Proakis, McGraw-Hill, 1983.
Detection of Coded Modulation Signals on Linear, Severely Distorted Channels Using Decision-Feedback Noise ..., Vedat Eyuboğlu, IEEE Transactions on Comm., vol. 36, No. 4, Apr. 1988.
Decision-Feedback Equalization of Time-Dispersive Channels with Coded Modulation, Kefeng Zhou, John G. Proakis and Fuyun Ling, IEEE, vol. 38, No. 1, Jan. 1990.
Performance of Trellis Codes for a Class of Equalized HF Channels, L. N. Wong and P. J. McLane, IEEE, 1986.
Decoding of Trellis-Encoded Signals in the Presence of Intersymbol Interference and Noise, P. R. Chevillat and E. Eleftheriou, IEEE Transactions on Comm., vol. 37, No. 7, Jul. 1989.
Reduced-State Sequence Estimation for Coded Modulation on Intersymbol ..., M. V. Eyuboğlu and S. U. H. Qureshi, IEEE Journal on Selected Areas in Comm., vol. 7, No. 6, Aug. 1989.

*Primary Examiner*—Stephen Chin
*Assistant Examiner*—T. Ghebretinsae
*Attorney, Agent, or Firm*—Collard & Roe, PC.

[57] ABSTRACT

This detector is for demodulating a received signal having been previously encoded by a trellis coded modulator and for producing an information data signal with reduced intersymbol interference. The detector comprises a predictor, a delay line, a feedforward filter, an adder, a subtracter, an updater and a trellis coded modulation estimator. The trellis coded modulation estimator has a feedback filter which is adjusted with respect to the feedforward filter to form a decision-feedback equalizer. Moreover, the delay line has a predetermined length which is adjusted according to an order of the feedforward filter and a depth of the trellis coded modulation estimator to achieve a zero relative delay between an output of the feedforward filter and outputs of the trellis coded modulation estimator.

19 Claims, 8 Drawing Sheets

$J_0 = \{J_{00} = (3_0, 3_1, 3_2, 3_3, 3_4, 3_5, 3_6, 3_7)\}$ $J_1 = \{J_{10} = (3_0, 3_4, 3_2, 3_6); J_{11} = (3_1, 3_5, 3_3, 3_7)\}$ $J_2 = \{J_{20} = (3_0, 3_4); J_{22} = (3_2, 3_6);$
$\quad\quad J_{21} = (3_1, 3_5); J_{23} = (3_3, 3_7)\}$ $J_3 = \{J_{30} = 3_0; J_{34} = 3_4; J_{32} = 3_2; J_{36} = 3_6;$
$\quad\quad J_{31} = 3_1; J_{35} = 3_5; J_{23} = 3_3; J_{37} = 3_7\}$

$$J_0 = \{J_{00} = (\mathfrak{z}_0, \mathfrak{z}_1, \mathfrak{z}_2, \mathfrak{z}_3, \mathfrak{z}_4, \mathfrak{z}_5, \mathfrak{z}_6, \mathfrak{z}_7)\}$$

$$J_1 = \{J_{10} = (\mathfrak{z}_0, \mathfrak{z}_4, \mathfrak{z}_2, \mathfrak{z}_6); J_{11} = (\mathfrak{z}_1, \mathfrak{z}_5, \mathfrak{z}_3, \mathfrak{z}_7)\}$$

$$J_2 = \{J_{20} = (\mathfrak{z}_0, \mathfrak{z}_4); J_{22} = (\mathfrak{z}_2, \mathfrak{z}_6);$$
$$J_{21} = (\mathfrak{z}_1, \mathfrak{z}_5); J_{23} = (\mathfrak{z}_3, \mathfrak{z}_7)\}$$

$$J_3 = \{J_{30} = \mathfrak{z}_0; J_{34} = \mathfrak{z}_4; J_{32} = \mathfrak{z}_2; J_{36} = \mathfrak{z}_6;$$
$$J_{31} = \mathfrak{z}_1; J_{35} = \mathfrak{z}_5; J_{23} = \mathfrak{z}_3; J_{37} = \mathfrak{z}_7\}$$

DETECTOR FOR DEMODULATING A RECEIVED SIGNAL AND PRODUCING AN INFORMATION DATA SIGNAL WITH REDUCED INTERSYMBOL INTERFERENCE

BACKGROUND OF THE INVENTION

1. Field of the Invention

The present invention relates to a detector for demodulating a received signal and producing an information data signal with reduced intersymbol interference, and more particularily to a detector for demodulating a trellis coded modulation received signal.

2. Brief Description of the Related Art

To meet the ever increasing demand for high speed, reliable data transmission, various techniques have been extensively studied. Amongst others, techniques using trellis coded modulation have been studied. Somehow, these techniques face major problems when used over unknown time-dispersive channels.

In the past, research interests on the adaptive equalization of time-dispersive channels have been mainly centred on uncoded systems:

S. U. H. Qureshi, "Adaptive Equalizer", Proc. of IEEE, Vol. 73, pp. 1349–1387, Sep. 1985;

S. U. H. Qureshi and E. E. Newhall, "An adaptive receiver for data transmission over time-dispersive channels", IEEE Trans. Inform. Theory, Vol IT-19, pp. 448–457, July 1973;

D. D. Falconer and F. R. Magee Jr., "Adaptive channel memory truncation for maximum likelihood sequence estimation", B. S. T. J., Vol. 52, pp. 1541–1562, Nov. 1973;

W. U. Lee and F. S. Hill, Jr., "A maximum likelihood sequence estimator with decision-feedback equalization", IEEE Trans. Comm., Vol. COM-25, pp. 971–979, Sep. 1977;

Y. Gu, T. Le-Ngoc and S. Cheng, "Adaptive decision-feedback equalization with MLSE based on predicted signals", Proc. of ICC'93, Geneva, Switzerland, May 1993; and J. G. Proakis, "Digital Communications", McGraw-Hill Inc., 1983.

In practice, linear equalizer (LE) and decision-feedback equalizer (DFE) are more often used. DFE has been shown to be superior to LE, especially when the channel has a spectrum null, and almost as effective as the maximum likelihood sequence estimation (MLSE) for the equalization of a large class of time-dispersive channels. However, because of the unavailability of delay-free reliable decisions of received symbols in a system using trellis coded modulation, this conventional adaptive algorithm cannot be directly applied. Several approaches have been proposed to use the conventional DFE for the equalization of unknown time-dispersive channels with TCM signals:

M. V. Eyuboglu, "Detection of coded modulation signals on linear, severely distorted channels using decision-feedback noise prediction with interleaving", IEEE Trans. Commun., Vol. COM-36, pp. 401–409, April 1988;

K. Zhou, J. G. Proakis and F. Ling, "Decision-feedback equalization of time-dispersive channels with coded modulations", IEEE Trans. Commun., Vol. COM-38, pp. 18–24, Jan. 1990;

L. N. Wong and P. J. McLane, "Performance of trellis codes for a class of equalized HF channels", IEEE Trans. Commun., Vol. COM-36, pp. 1330–1336, Dec. 1988; and P. R. Chevillat and E. Eleftheriou, "Decoding of trellis-encoded signals in the presence of intersymbol interference and noise", IEEE Trans. Commun., Vol. COM-37, pp. 669–676, July 1989.

Eyuboglu proposed a detector using Decision-Feedback Noise Prediction with Interleaving (DFNPI). In the DFNPI, the interleaver/deinterleaver pair rearranges the order of received signals prior to decoding, in a manner that the delayed reliable decisions from TCM detector can be used for feedback.

A similar scheme was presented in Zhou, Proakis and Ling, but a recursive least square algorithm under the minimum mean square error (MMSE) criterion was employed to adjust the DFE instead of the zero-forcing algorithm. Considering the fact that the unpredictable noise in the first received symbol of each interleaving period can considerably degrade the overall system performance, a two-stage structure with reference insertion was studied. Although the DFNPI can approach to the block error rate performance of an ideal DFE, as indicated in: M. V. Eyuboglu and S. U. Qureshi, "Reduced-state sequence estimation for coded modulation on intersymbol interference channels", IEEE J. of Selected Areas on Commun., Vol. SAC-7, pp. 988–995, April 1989, the scheme significantly increases the throughput delay, particularly in the two-stage scheme, and also requires a modification to the transmitter. Apart from these, the reference insertion, introduced to improve the SEP performance, results in a decrease in the effective transmission rate of the system.

It is worth noting that the schemes proposed in Eyuboglu and Zhou do not solve the error propagation problem discussed in S. U. H. Qureshi, "Adaptive Equalizer", Proc. of IEEE, Vol. 73, pp. 1349–1387, Sept. 1985. This is the reason why the probability of block error instead of the SEP is used to measure the performance of the DFNPI.

To avoid the problem of the long throughput delay and the efficiency degradation of the DFNPI, an alternative was investigated by Chevillat and Eleftheriou. In their scheme, the received signals are first pre-filtered by a DFE and then passed through a RSSE detector but the feedback symbols required by the DFE are from the delay-free tentative decision of the RSSE detector. Although superior to the hard-decision maker as in a conventional DFE, the tentative decision is not as reliable as the output to the RSSE detector.

Also known in the art is U.S. Pat. No. 5,031,195 granted on Jul. 9, 1991 which describes a fully adaptive modem receiver using whitening matched filtering for data transmission systems which use trellis-coded modulation and comprises an adaptive whitened-matched filter and a reduced-state trellis decoder. The whitened-matched filter consists of an adaptive linear equalizer with fractional-T spaced coefficients, and an adaptive linear predictor. The decoder combines the functions of equalization and trellis-coded modulation decoding. It employs combined intersymbol interference and code states which exploit the set-partitioning structure of the underlying TCM code to provide full or reduced-state information about past ISI terms. The decoder branch metric cancels those ISI terms that are not, or are only partially, represented by the trellis states.

Also known is U.S. Pat. No. 5,303,264 granted on Apr. 12, 1994 which describes an adaptive equalizer using recursive least-squares algorithm and method therefor. This patent describes an arrangement for equalizing waveform distortion caused by multipath fading using a recursive least-squares algorithm into which a forgetting factor is introduced. An incoming signal is applied to an automatic gain controller which generates a first signal whose value varies with a signal-to-noise ratio of the incoming signal. A forgetting factor controller is coupled to the automatic gain controller to receive the first signal and generates the forgetting factor which value varies with the value of the first signal. An adaptive equalizer equalizes the waveform distortion using the forgetting factor according to the recursive least-squares algorithm.

U.S. Pat. No. 5,157,690 granted on Oct. 20, 1992, describes an adaptive convergent decision-feedback equalizer for reducing intersymbol interference in a data communication system. The intersymbol interference is cancelled by generating and subtracting an estimation of the interference from a received signal, which estimation is generated by a N-tap transversal filter in which individual delayed received signals stored in the taps are multiplied by the respective adaptable tap coefficient and summed to form a digital representation of the intersymbol interference present.

In U.S. Pat. No. 5,052,000 granted on Sep. 24, 1991, there is described a technique for improving the operation of decision feedback equalizers in communications systems utilizing error correction. This technique consists of using decision-feedback equalization and error correction coding by means of a plurality of coders and decoders respectively disposed in the transmitter and receiver. The plurality of encoders and decoders is used to interleave the data symbols so that each coder and decoder is operative upon every Mth symbol, where M is the number of coders or decoders. By judiciously choosing M, both the probability of noise impairing the recovery of successive symbols and the error propagation effects inherent in decision-feedback equalizers are reduced.

Also known in the art is U.S. Pat. No. 4,905,254 granted on Feb. 27, 1990 which describes an arrangement for combating intersymbol interference and noise introduced in a data signal transmitted by a dispersive transmission channel. This arrangement comprises an adaptive equalizer with a symbol detector for forming tentative symbol decisions as well as a post-detector for forming final symbol decisions using an auxiliary signal which is derived from the transmitted data signal at the input of the arrangement.

In U.S. Pat. No. 4,953,183 granted on Aug. 28, 1990, there is described an arrangement for combatting intersymbol interference and noise. This arrangement comprises a receive filter, a first decision circuit for forming preliminary symbol decisions in response to the transmitted data signal, a second decision circuit for forming final symbol decisions, means for compensating pre- and post-recursive intersymbol interference, and a combining circuit for forming the input signal for the second decision circuit.

In U.S. Pat. No. 5,263,033, granted on Nov. 16, 1993, there is described a joint data and channel estimation using fast blind trellis search. It consists of finding, for every possible sequence that can be transmitted, the best possible channel fit corresponding to the noisy channel output sequence, by using the least squares procedure. The data and the channel are estimated to be those with the overall best fit.

However, the prior art does not describe a reliable and delay-free decision of received symbols for TCM techniques over time-dispersive channels, and more particularly severely distorted channels. Also, it does not describe a detector avoiding increasing throughput delay and/or decreasing transmission efficiency.

SUMMARY OF THE INVENTION

It is an object of the present invention to provide a decoder for demodulating a received signal and producing an information data signal with reduced intersymbol interference, which has reduced throughput delay, and which achieves significant performance improvement for received signals transmitted over severe channel distortion.

In accordance with an aspect of an object of the present invention, there is provided a detector for demodulating a received signal and producing an information data signal with reduced intersymbol interference, the received signal having been previously encoded by a trellis coded modulator. The detector comprises:

a predictor means for producing a predicted signal and a first delayed signal from the received signal;

a delay line for delaying the first delayed signal and generating a second delayed signal accordingly;

a feedforward filter means for filtering the second delayed signal with respect to an updated vector signal a, and generating a filtered signal z accordingly;

an adder for adding the filtered signal z to a filtered signal v and generating a resulting filtered signal;

a subtracting means for subtracting the resulting filtered signal from an estimated symbol signal to obtain an error signal;

updating means for calculating the updated vector signal a and an updated vector signal b with respect to the error signal and an estimated vector signal x; and a trellis coded modulation estimating means corresponding to the trellis coded modulator, for estimating the estimated symbol signal and the estimated vector signal x from the predicted signal, and for demodulating the predicted signal into an information data signal, the trellis coded modulator estimating means comprising a feedback filter means for filtering the estimated vector signal x with respect to the updated vector signal b and therefrom generating the filtered signal v, the feedback filter means being adjusted with respect to the feedforward filter means to form a decision-feedback equalizer.

Preferably, the feedback filter means is embedded in the trellis coded modulation estimating means.

BRIEF DESCRIPTION OF THE DRAWINGS

In order to impart full understanding of the manner in which this object and others are attained in accordance with the present invention, preferred embodiments thereof will be described hereinafter with reference to the accompanying drawings wherein:

FIG. 9b is a set partitioning of a 4s8p-TCM according to FIG. 9a;

In the following description and the drawings, the same reference numerals will refer to the same structural elements.

DESCRIPTION OF PREFERRED EMBODIMENTS

To enlighten the following description, these acronyms will be used:

AWGN: Additive White Gaussian Noise;
DFE: Decision-feedback Equalizer;
ECIR: Equivalent Channel Impulse Response;
FBF: Feedback Filter;
FFF: Feedforward Filter;
FIR: Finite Impulse Response;
Iid: independent and identically distributed;
ISI: Intersymbol Interference;
MLSE: Maximum Likelihood Sequence Estimator;
MMSE: Minimum Mean Square Error;
RSSE: Reduced-State Sequence Estimator;
SEP: Symbol Error Probability;
SNR: Signal to Noise Ratio;
TCM: Trellis Coded Modulation;

Also for convenience, the term DFE will be used in the following description to denote a fractionally-spaced DFE which consists of a fractionally-spaced feed-forward filter (FFF) and a symbol-spaced feedback filter (FBF). The RSSE detector for TCM signals is further in introduced as TCM-RSSE detector.

Figure 1:
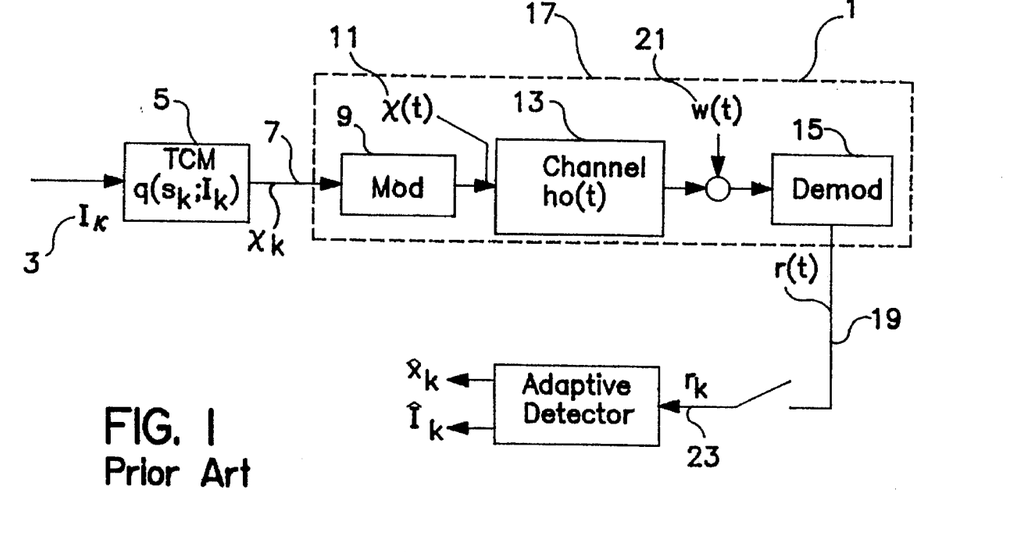
FIG. 1 is a schematic block diagram of a data transmission system as known in the art.

The present invention is a decoder for demodulating a received signal and producing an information data signal with reduced intersymbol interference. Referring to FIG. 1, there is shown a block diagram of the data transmission system 1 from which is received the received signal to be demodulated. An information data $I_k$ 3 is taken from an information symbol set $\{\xi_0, \xi_1, \ldots, \xi_{N-1}\}$, i.e. $I_k \in \{\xi_0, \xi_1, \ldots, \xi_{N-1}\}$ where N is the size of the symbol set $\{I_k\}$ represents an independent and identically distributed (Iid) transmitted sequence with symbol interval T. The state of a TCM encoder 5 (also called hereinafter trellis coded modulator) is denoted at time k by $S_k$. The trellis coded modulator 5 generates an output symbol $x_k = q(s_k; I_k)$ 7 where $q(.)$ is called a mapping function of the trellis coded modulator, and the complex symbol $x_k$ is taken from $\{\Im_0, \Im_1, \ldots, \Im_{M-1}\}$ which is the transmitted symbol set with size M. The symbol energy of this signal $E_s = E\{x_k x_k^*\}$ where $x_k^*$ means the conjugation of $x_k$ and $E\{.\}$ represents the expectation of its argument is normalized. Then $X_k$ is shaped (filtered) into continuous-time signal $x(t)$ which is given by $$x(t) = \sum_k x_k x_s(t - kT) \qquad (1)$$

where $x_s(t)$ is the transmitted waveform of a symbol. After the modulation 9 with single carrier, $x(t)$ 11 is transmitted through the channel $H_0(t)$ 13. For convenience, the modulator 9 and demodulator 15 are considered in the time-dispersive channel 17 to have impulse response $h(t)$. Also, the channel impulse response $h(t)$ is assumed unknown and slowly time-variant. The sampling rate of the sampler is determined by the detector. The received baseband complex signal $r(t)$ 19 is corrupted by an AWGN represented by $w(t)$ 21. $r(t)$ 19 can be described by $$\begin{aligned} r(t) &= \int_{-\infty}^{\infty} x(t-\tau)h_0(\tau)d\tau + w(t) \\ &= \sum_k^{-\infty} x_k h(t-kT) + w(t) \end{aligned} \qquad (2)$$

where:

$$h(t) = \int_{-\infty}^{\infty} x_s(\tau)h_0(t-\tau)d\tau \qquad (3)$$

On the receiver side, the received signal $r(t)$ 19 is sampled into a discrete-time signal $r_k$ 23 at a sample rate $$f_s = \frac{m}{T} = \frac{1}{T_s} \text{ with } m = \frac{1}{n}.$$

Here 1 and n are two integers satisfying $1 \geq n \geq 0$. Following Eq (2), $r_k$ can be expressed as $$\begin{aligned} r_k &= \sum_i x_i h((k-mi)T_s) + w_k \\ &= r_{dk} + w_k \end{aligned} \qquad (4)$$

where:

$$r_{dk} = \sum_i x_i h((k-im)T_s)$$

is the effective signal carried by the received signal 19, and $w_k$ the sample of $w(t)$ 21. Obviously, $\{W_k\}$ is an iid complex Gaussian random sequence. The double-side power spectrum density of $\{W_k\}$ is assumed to be $N_0/2$. The received SNR is defined as $$SNR_i = \frac{E_s \sum_i |h_i|^2}{N_0} \qquad (5)$$

Since the channel 17 is time-dispersive, the received effective signal $r_{dk}$ contains ISI component. To reduce the effect of the ISI on the decision of transmitted data, the received discrete complex signal $r_k$ 23 is further processed by a detector 25 according to the present invention.

Figure 2:
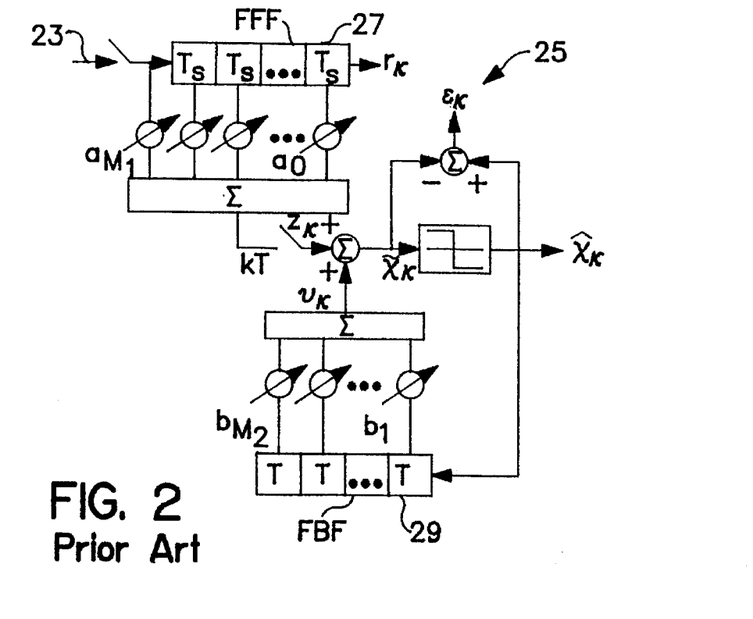
FIG. 2 is a schematic block diagram of a Decision-feedback Equalizer as known in the art.

Referring now to FIG. 2, there is shown a conventional fractionally-spaced DFE 25 for uncoded modulation signals, as known in the art. This DFE consists of a FFF 27 and a FBF 29. The right-most end of the FFF 27 was chosen as the reference point of the received signal $r_k$. Let us denote $$a_k = [a_0 k \; a_1 k \; a_2 k \ldots a_{M_1} k] \qquad (6)$$

$$r_k = [r_k \; r_{k+1} \; r_{k+2} \ldots r_{k+M_1}] \qquad (7)$$

$$b_k = [b_{1k}\, b_{2k} \ldots b_{M_2 k}] \tag{8}$$

$$x_k = [x_{k-1}\, x_{k-2} \ldots x_{k-M_2}] \tag{9}$$

where $a_k$ are the coefficients of the FFF 27, $r_k$ is the output of the FFF 27, $b_k$ are the coefficients of the FBF 29 and $X_k$ is the output of the FBF 29.

Since the DFE 25 updates its coefficients every symbol interval, one can find from FIG. 2 that $$\tilde{x} = z_k + v_k \tag{10}$$

represents the estimate of $X_k$ where:

$$Z_k = a_k r'_k \tag{11}$$

$$V_k = b_k \hat{x}'_k \tag{12}$$

and $\hat{x}'_k$ denotes the transposition of a matrix. For conciseness, k is used to time-index the discrete signals. For the fractionally-spaced FFF of the DFE, time-index k stands for the time instant of $t=kT_s$ while k represents the time instant $t=kT$ in the symbol-spaced FBF. A gradient algorithm is applied to the adjustment of the weighting coefficients $a_k$ and $b_k$ $$a_{k+1} = a_k + \mu \epsilon_k r^*_k \tag{13}$$

$$b_{k+1} = b_k + \mu \epsilon_k x^*_k \tag{14}$$

to minimize the MMSE $$E\{\epsilon^2_k\} = E\{|x_k - \hat{x}_k|^2\}. \tag{14}$$

Here $\mu$ is an updating step size of the gradient algorithm. In a decision direct mode, the DFE uses the error signal $\epsilon_k = x_k - \hat{x}_k$ in Eq. (13) where $\hat{x}_k$ is detected from $\tilde{x}_k$.

One can see from Eq (6)–Eq (14) and FIG. 2 that, in order to cancel the post-cursor IS I component $v_k$ from the equalized signal $Z_k$, the DFE must produce detected symbols without delay.

Figure 3:
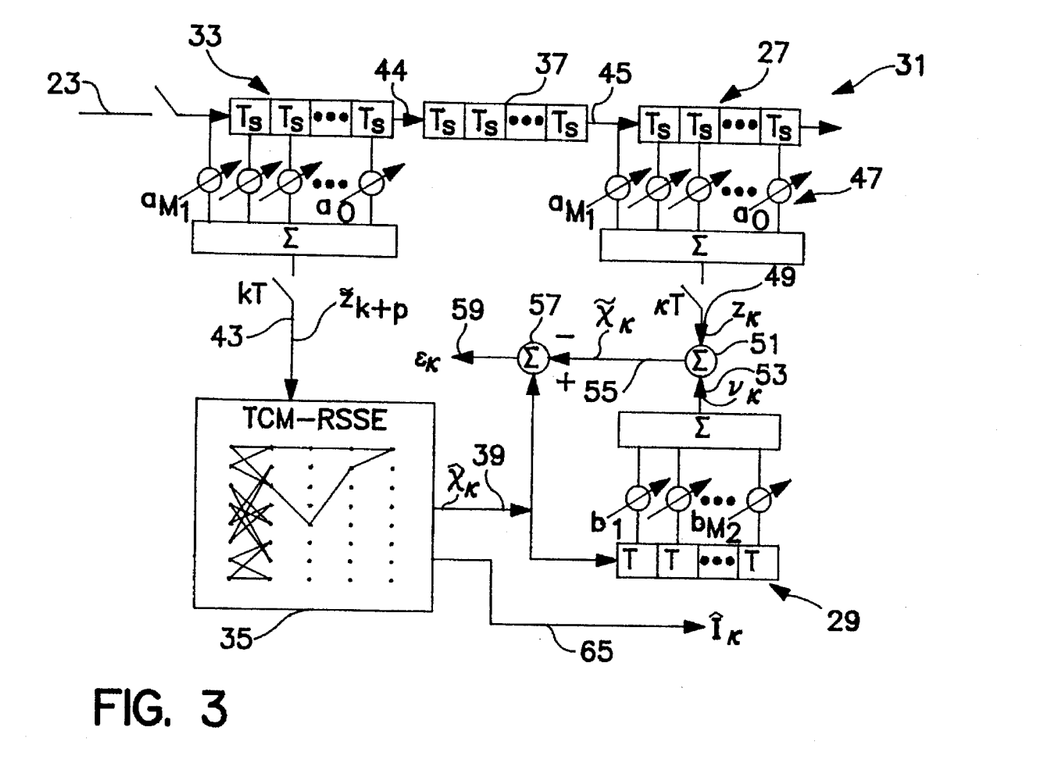
FIG. 3 is a schematic block diagram of some of the parts of a decoder of the present invention.
Figure 4:
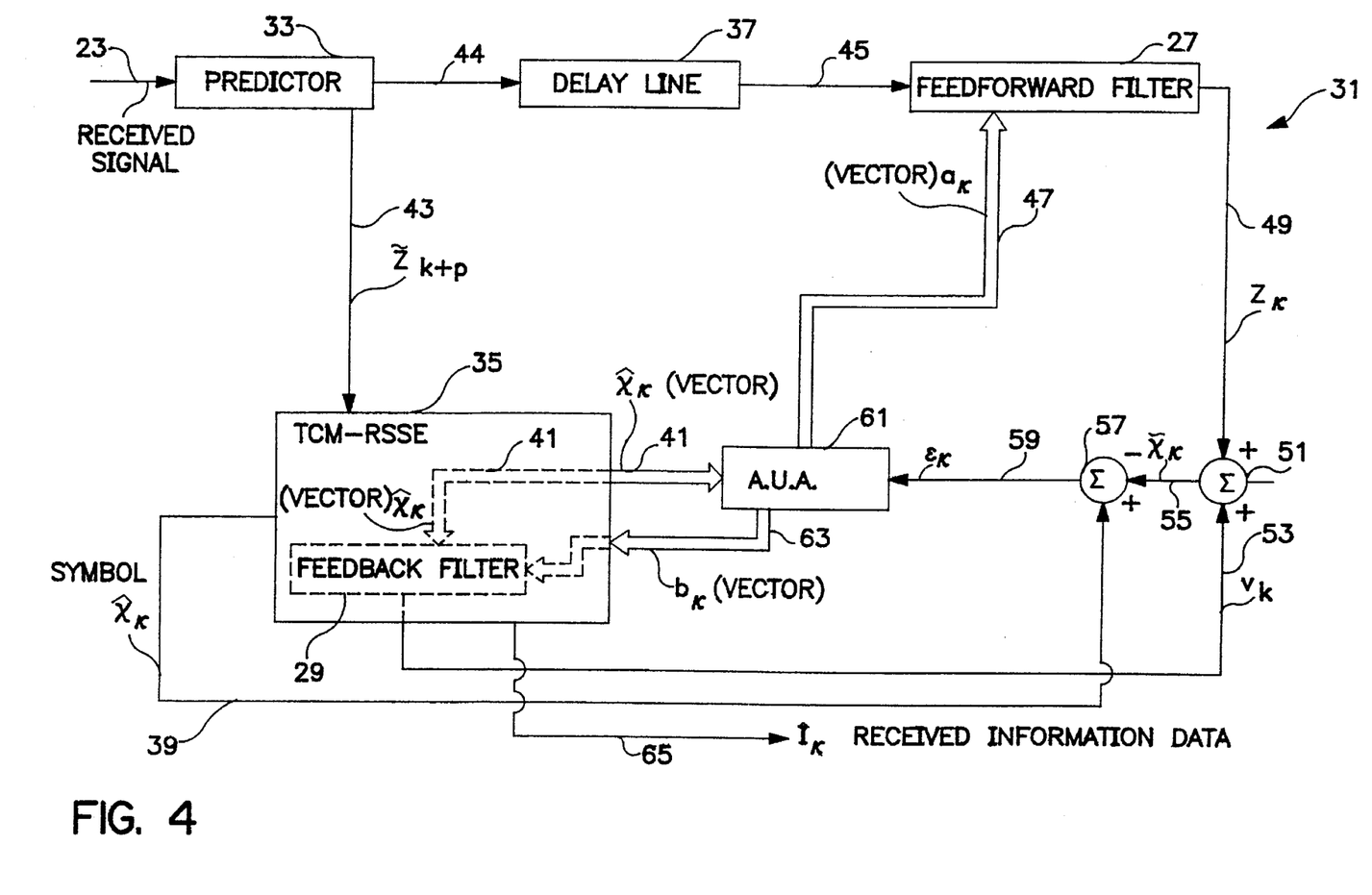
FIG. 4 is a schematic block diagram of a decoder according to the present invention.

The proposed detector 31 is adaptive and is briefly shown on FIG. 3 and showed in more detail on FIG. 4. The detector 31 has a predictor means 33 for producing a predicted signal 43 and a first delayed signal 44 from the received signal 23, and a delay line 37 for delaying the first delayed signal 44 and generating a second delayed signal 45. The detector 31 also has a feedforward filter means 27, called feedforward filter from hereon, for filtering the second delayed signal 45 with respect to an updated vector signal a 47, and for generating a filtered signal z 49 accordingly. The detector 31 further has an adder 51 for adding the filtered signal z 49 to a filtered signal v 53 and generating a resulting filtered signal 55. It also includes a subtracting means 57 for subtracting the resulting filtered signal 55 from an estimated symbol signal 39 to obtain an error signal 59. It further includes an updating means 61 (called A. U. A. on FIG. 4 and not shown on FIG. 3) for calculating the updated vector signal a 47 and an updated vector signal b 63 with respect to the error signal 59 and an estimated vector signal x 41.

A trellis coded modulation estimating means 35, corresponding to the trellis coded modulator 5, estimates the estimated symbol signal 39, also called TCM symbol, and the estimated vector signal x 41 from the predicted signal 43, and demodulates the predicted signal 43 into an information data signal 65. The trellis coded modulator estimating means 35 has a feedback filter means 29 which filters the estimated vector signal x 41 with respect to the updated vector signal b 63 and therefrom generates the filtered signal v 53. The feedback filter means 29 is adjusted with respect to the feedforward filter means 27 to form a decision-feedback equalizer. The trellis coded modulation estimating means 35 is a trellis coded modulation reduced-state sequence estimator, and the updating means 61 is a least means square algorithm or a recursive least square algorithm. The information data signal 65 is described by $\hat{I}_k$. The estimated symbol signal 39 associated with the symbol $I_k$ is denoted as $X_k$.

So, as shown on FIGS. 3 and 4, the right-most part of the detector 31 is the DFE, which is similar to the conventional DFE shown on FIG. 2. The left-most part of the detector 31 is the predictor means 33, in a preferable manner a fractionally-spaced finite impulse response (FIR) filter, also named predictor/equalizer, which has the same structure as the FFF 27, i.e. its weighting coefficients are the duplicate of those of the FFF 27. This FIR filter 33 may perform not only as an input signal predictor for the trellis coded modulation estimating means 35, called TCM-RSSE hereon, but also as a linear equalizer which pre-equalizes the received signal 23 before inputting it to the TCM-RSSE detector 35. The delay line 37, which is preferably a fractionally-spaced delay-line, is placed between the FIR predictor 33 and the FFF 27 for the adjustment of the time difference between the TCM-RSSE detector 35 and the DFE 27 and 29. It makes the TCM-RSSE detector 35 produce a decision of an estimated symbol signal $X_k$ 39 free from delay relative to the DFE 27 and 29.

The introduction of the delay-line 37 does not increase the throughput delay of the detector 31, but allows the DFE 27 and 29 to obtain the estimated symbol signal $X_k$ 39 and the estimated vector signal $X_k$ 41 directly from the output of the TCM-RSSE detector 35 to update its weighting coefficients.

In a preferable manner, the feedback filter means 29 is embedded in the TCM-RSSE 35. Also, the delay line 37 has a length adjusted according to an order of the feedforward filter means 27 and a depth of the TCM-RSSE 35, in order to achieve a zero relative delay between the filtered signal z 49 and the estimated vector signal 46 and the estimated symbol signal 39.

Since the estimated symbol signal $x_k$ 39 and the estimated vector signal $x_k$ 41 are very reliable, an ideal DFE performance can usually be achieved. In fact, the DFE 27 and 29 is the core of the proposed detector. It supplies not only the weighting coefficients needed by the predictor/equalizer 33 but also an observed ECIR required by the TCM-RSSE 35. The DFE 27 and 29, the TCM-RSSE 35 and the predictor/equalizer 33 are mutually inseparable. Because the decision process of the TCM-RSSE 35 is with memory, the error propagation, usually taking place in conventional DFEs. The SEP performance of an ideal DFE with TCM can be achieved in most cases. When the channel distortion is severe, a significant improvement of SEP performance is obtained In addition, neither reference-insertion and nor interleaving operation are needed. The stability of the adaptation process is the same as a conventional DFE.

The DFE 27 and 29 can produce the ECIR needed by the TCM-RSSE 35. The following paragraphs mathematically explain the source of the ECIR.

The output of the FIR predictor $Z_{k+p}$ 43 is a p-step predicted value of the equalized signal $Z_k$ given by the embedded DFE where p is a non-negative integer. Following Eq (11) one obtain $$z_{k+p} = a_{k+p} r^t_{k+p} \quad (15)$$

Let $$\tilde{z}_{k+p} = a_k r^t_{k+p} \quad (16)$$

it follows that $$E\{z_{k+p} - \tilde{z}_{k+p}\} = E\{a_{k+p} - a_k\} r^t_{k+p} \quad (17)$$

Since $a_k$ and $b_k$ are updated automatically, under the assumption of slowly time-variant characteristics of the channel $$a_k = a_{opt} + \Delta a_k \quad (18)$$

and $$b_k = b_{opt} + \Delta b_k \quad (19)$$

hold after the convergence of the adaptive algorithm. Here $a_{opt}$ and $b_{opt}$ are optimum values of $a_k$ and $b_k$, which make the DFE approach to an MMSE, $\Delta a_k$ and $\Delta b_k$ are zero-mean noise sequences reflecting the fluctuation of the coefficients $a_k$ and $b_k$. Under the assumptions of an ideal feedback to the DFE, $a_{opt}$ and $b_{opt}$ are then given by $$a^t_{opt} = R^{-1} \alpha^t \quad (20)$$

and $$b^t_{opt} = H a^t_{opt} \quad (21)$$

In Eq. (20) and Eq. (21), R is the covariance matrix of received signals with elements $$\rho_{ij} = E\{r_{k+i} r^*_{k+j}\} \quad (22)$$
$$= \sum_{k=-\infty}^{\infty} h(mk+i)T_s h^*(mk+j)T_s + \frac{N_0}{s} \sigma_{ij}$$
$$0 \leq i,j \leq M_1$$

and $\alpha$ is a vector whose elements are the cross correlations $$\alpha_i = h^*(iT_s); \quad 1 \leq i \leq M_1 \quad (23)$$

while H is an $M_1 \times M_2$ matrix with elements $h_{ij} = h((mi+j)*T_s)$. Since $a_{opt}$ and $b_{opt}$ are independent of time-index k, substituting Eq. (18) into Eq. (17), gives $$E\{\tilde{z}_{k+p}\} = E\{z_{k+p}\} \quad (24)$$

i.e. $\tilde{z}_{k+p}$ is the non-biased estimate of $z_{k+p}$. Eq. (24) also means that $\tilde{z}_{k+p}$ is the non-biased MMSE prediction of $Z_k$ given by Eq. (11).

Assuming no error in the sequence fed into the embedded DFE and substituting Eq. (4) into Eq. (11), Eq. (11) can be rewritten as $$z_k a_k r_{dk}^t + g_k \quad (25)$$

where:

$$g_k = a_k w^t_k \quad (26)$$

$$w_k = [w_k \; w_{k+1} \ldots w_{k+M1}] \quad (27)$$

$$r_{dk} = [r_{dk} \; r_{dk+1} \ldots r_{dk+M1}] \quad (28)$$

$g_k$, which is equivalent to an iid complex Gaussian random sequence, represents the additive noise at the output of the FFF of the embedded DFE. Thus substituting Eq. (25)–Eq. (28) into Eq. (14) gives $$E\{\epsilon_k^2\} = E\{|x_k - z_k - v_k|^2\} \quad (29)$$
$$= \{|z_k - (x_k - v_k)|^2\}$$
$$= E\{|a_k r^t_{dk} - (x_k - v_k)|^2\} + E\{g_k^2\}$$

When the channel is equalizable, it is reasonable to assume the residual ISI negligible. $a_k r^t_{dk} \approx x_k - v_k$ after the convergence of the considered adaptive algorithm, i.e. $x_k - V_k$ represents the MMSE estimate of $a_k r^t_{dk}$ in Eq. (29). If $Z_k$ is considered as the output of the equivalent channel composed of the channel $h_k$ and the DFE (FIG. 4), $\{1; -b_k\}$ represents the impulse response of the equivalent channel. Thus, following Eq. (12), Eq. (25), it is held that $$z_k = x_k - b_k x^t_k + g_k \quad (30)$$

Following Eq. (30) and Eq. (24), give $$\tilde{z}_{k+p} = x_{k+p} - b_k x^t_{k+p} + g_{k+p} \quad (31)$$

MLSE can be applied to Eq. (31) for the estimation of the TCM symbol $X_{k+p}$ due to the Iid characteristics of the equivalent additive noise $g_{k+p}$. The metric of the MLSE is given by $$\Gamma_{k+p+1} = \Gamma_{k+p} + |z_{k+p} - x_{k+p} + b_k x_{k+p}|^2 = \Gamma_{k+p} + |z_{k+p} + v_{k+p} - x_{k+p}|^2 \quad (32)$$

where $\tilde{v}_{k+p} = b_k x^t_{k+p}$ is the residual ISI estimated on the basis of the path history of the MLSE algorithm. In the standard MLSE algorithm (Viterbi Algorithm), $\tilde{v}_{k+p}$ is completely described by the trellis state. When $M_2$ is large the standard MLSE algorithm becomes complex. Fortunately, the TCM-RSSE algorithm can be applied to estimate $x_k$ and $I_k$ instead of the standard MLSE.

Figure 9A:
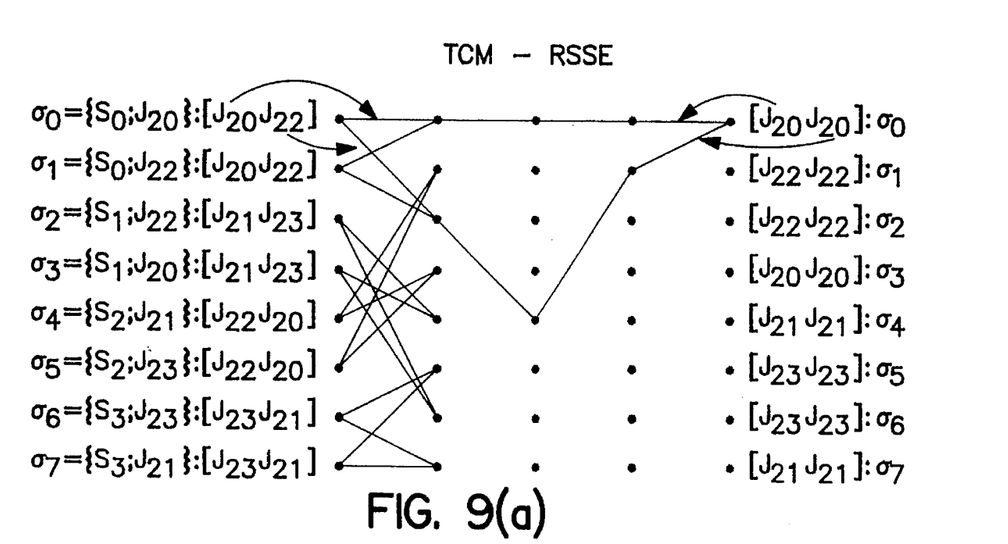
FIG. 9a is a schematic representation of a super trellis of TCM-RSSE.
Figure 9B:
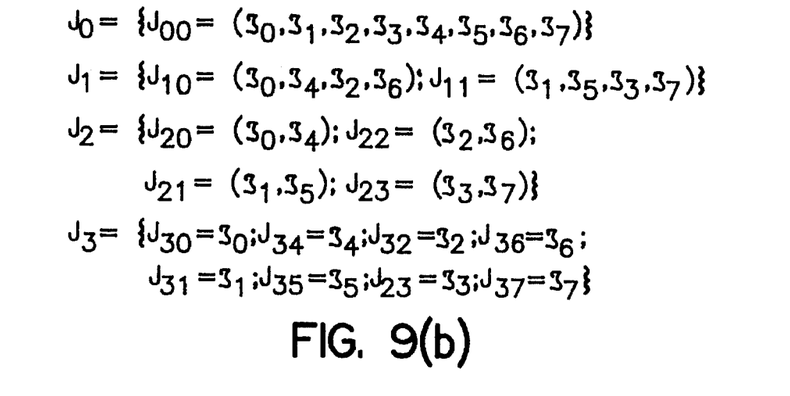

Let $J_i$, $i=0, 1, \ldots, M-1$, denote a partitioning of $\{\mathfrak{S}_0, \mathfrak{S}_1, \ldots, \mathfrak{S}_{M-1}\}$ where $J_{i+1}$ is the further fine partitioning of $J_i$. The super-state of the TCM-RSSE can be obtained as:

$$\sigma_k = \{s_k; J(x_{k+p-1}, \beta_1), \ldots, J(x_{k+p-L}; \beta_L)\} \quad (33)$$

where $J(x_{k+p-i}; \beta_i) \in J_{\beta i}$ is the subset which the TCM symbol $x_{k+p+i}$ belongs to and $\beta_1 \geq \beta_2 \geq \ldots \geq \beta_L$. The integer $L \leq M_2$ in Eq. (33) is the length of the ECIR which the TCM-RSSE deals with (e.g. FIG. 9 with L=1 and $\beta_L=2$). Let the detection depth of the RSSE algorithm equal to p. Then, the metric given by Eq. (32) can be rewritten as $$\Gamma_{k+p+1}(\sigma_{k+1}) = \Gamma_{k+p}(\sigma_k) + |z_{k+p} + \hat{v}_{k+p}(\sigma_k) - x_{k+p}|^2 \quad (34)$$

where $\{x_{k+p}, x_{k+p-1}, \ldots, x_k\}$ represents the path history. $\hat{v}_{k+p}(\sigma_k)$ describes the residual ISI estimated according to the history of the path emerging to the super-state $\sigma_k$ in the TCM-RSSE super-trellis. The output of the TCM-RSSE give $\hat{x}_k$ as well as $\hat{i}_k$. When L-0, the TCM-RSSE degenerates to the conventional TCM detection algorithm except that the time-index of the path history in this algorithm is different from that in the conventional TCM and the cancellation of residual ISIs are carried out based on the path history of the TCM trellis.

Without loss of generality, let us consider now Ungerboeck's four state TCM, called 4s8p-TCM. The uncoded 8PSK and QPSK signals are used as references to the TCM symbol $x_k$ and data $I_k$ of the 4s8p-TCM, respectively. We first review the performance of the 4s8p-TCM over an AWGN channel and then evaluate the performance of the present scheme with comparison to other schemes.

Figure 5A:
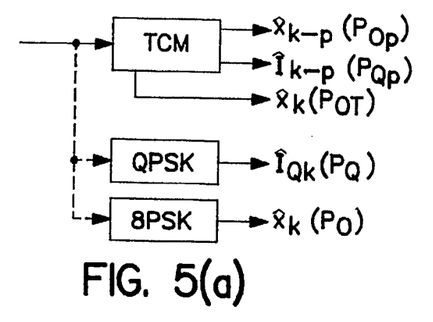
FIG. 5a is a block diagram of the symbol error probability of an uncoded QPSK signal, an 8PSK signal, and the data and TCM symbols at an output of a detector according to the present invention.

Denote the SEPs of uncoded QPSK and 8PSK signals over AWGN channels by $P_q$ and $P_o$, and the SEPs of the data and the TCM symbols at the output of the TCM detector by $P_{qp}$ and $P_{op}$, respectively (FIG. 5(a)). There is:

$$P_Q = Pr\{\hat{I}_{Qk} \neq I_{Qk}\}; I_{Qk} \in \{\xi_0, \xi_1, \xi_2, \xi_3\} \tag{35}$$

$$P_O = Pr\{\hat{x}_{Ok} \neq X_{Ok}\}; x_{Ok} \in \{\Im_0, \Im_1, \ldots, \Im_7\} \tag{36}$$

$$P_{Qp} = Pr\{\hat{I}_{k-p} \neq I_{k-p}\} \tag{37}$$

$$P_{Op} = Pr\{\hat{x}_{k-p} \neq x_{k-p}\} \tag{38}$$

Figure 5B:
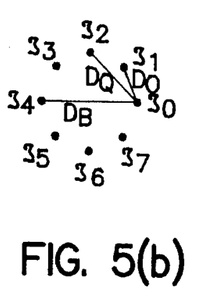
FIG. 5b is a constellation of a 4s8p-TCM signal.
Figure 5C:
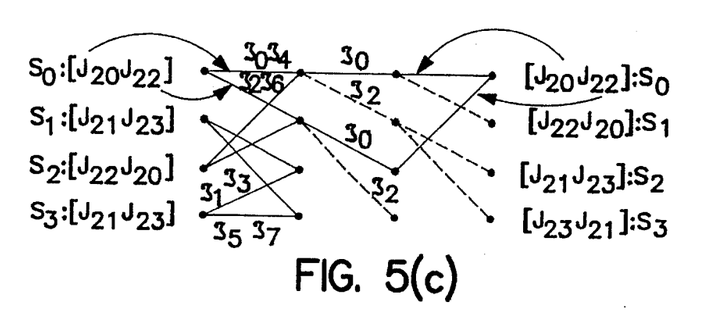
FIG. 5c is an encoding trellis for the constellation of FIG. 5b.
Figure 5D:
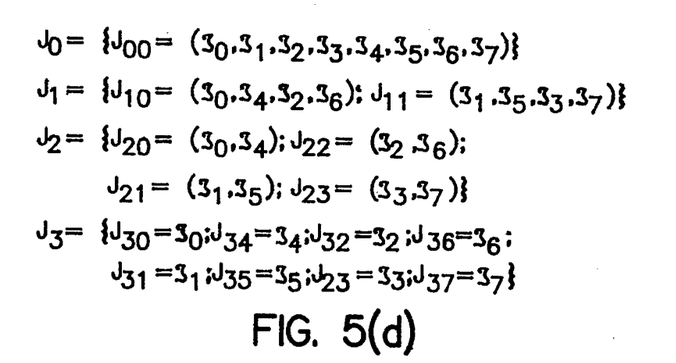
FIG. 5d is a set partitioning of a 4s8p-TCM signal.

FIG. 5(b) shows the constellation of the 4s8p-TCM signal whose encoding trellis is illustrated in FIG. 5(c). For conciseness, $s_n:[J_{ii}J_{ii}]$ is used to denote the paths departing from the state $s_n$ with outputs as $J_{ii}$ and $J_{ij}$ while $[J_{ii}J_{ij}]$: $s_n$ depicting the paths emerging into the state $S_n$ with outputs as $J_{ii}$ and $J_{ij}$. In FIG. 5(c), only one line between nodes was drawn in the trellis although, in fact, parallel paths exist in between the two connected nodes. The Euclidean distances between the points in the symbol constellation and the path with minimum Euclidean distance of the encoding trellis are also labelled in FIG. 5(b)(c), respectively. Thus, there is obtained $$P_Q \approx Q\left(\frac{D_Q}{\sqrt{2N_0}}\right) \tag{39}$$

and $$P_O \approx Q\left(\frac{D_O}{\sqrt{2N_0}}\right) \tag{40}$$

where Q(.) is a Gaussian integration function. Since the minimum Euclidean distance given by the encoding trellis is greater than the one between parallel paths in the TCM trellis (FIG. 5(c)) the SEP of the detected symbol $l_{k+p}$ is mainly determined by the selection of the parallel path and given by $$P_{Qp} \approx Q\left(\frac{min\{|J_{20}|\}}{\sqrt{2N_0}}\right) = \left(\frac{D_B}{\sqrt{2N_0}}\right). \tag{41}$$

Therefore, following Eq. (39) and Eq. (41), the gain of the TCM over the uncoded QPSK is given by:

$$G_T = 10 log\left(\frac{D_B^2}{D_Q^2}\right) \approx 3 \text{ dB}. \tag{42}$$

It can be observed from FIG. 5(c) that a wrong selection of the parallel path must yield an error in data symbol decision of $I_k$ and, consequently, leads to a wrong decision on the associated TCM symbol $X_k$. It follows that the SEP of the detected TCM symbol $x_k$ associated with the data $I_k$ is almost the same as the SEP of the detected data, i.e. $P_{Op} \sim P_{Qp}$. Thus the gain of the detected TCM symbol $\hat{x}_{k-p}$ over uncoded 8PSK signals is given by:

$$G_{TO} = 20 log\left(\frac{D_B}{D_O}\right) \approx 8.3 \text{ dB}. \tag{43}$$

Comparing uncoded QPSK with 8PSK, if only the SEP performance is considered, Eq. (39) and Eq. (40) indicate that the gain of an uncoded QPSK over an uncoded 8PSK is given by:

$$G_{QO} = 20 log\left(\frac{D_Q}{D_O}\right) \approx 5.3 \text{ dB}. \tag{44}$$

Therefore, $$G_T = G_{TO} - G_{QO} \tag{45}$$

Figure 6:
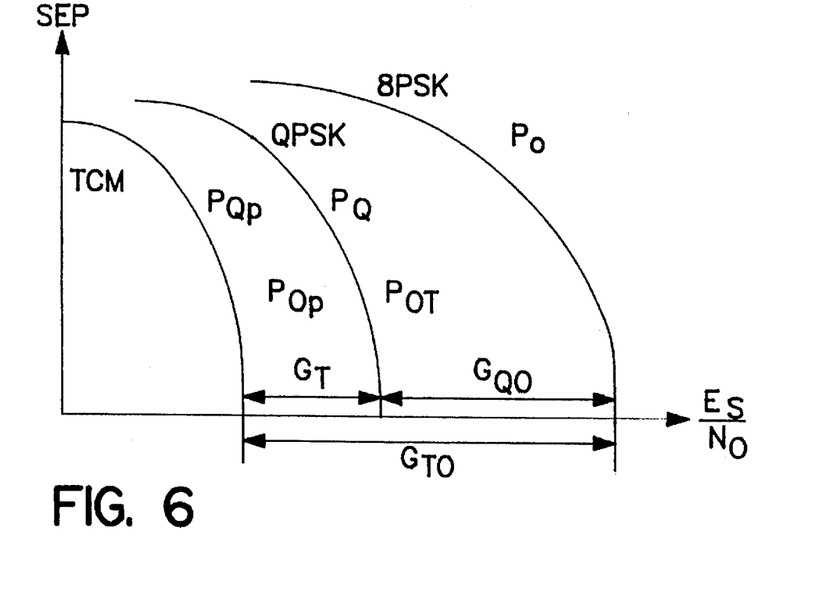
FIG. 6 is a graph illustrating the relationship between $G_T$, $G_{T0}$ and $G_{Q0}$.

Eq. (42)"Eq. (45) explain that, although the resulted TCM symbols (8PSK) loss 5.3 dB relatively to uncoded QPSK signals, the soft-decision of the TCM signal finally gains 8.3 dB over the 8PSK signals. This guarantees the TCM signals still gain 3 dB over the uncoded QPSK. Note that, over an AWGN channel, $G_T$, $G_{TO}$ and $G_{QO}$ can be illustrated by FIG. 6.

Figure 7:
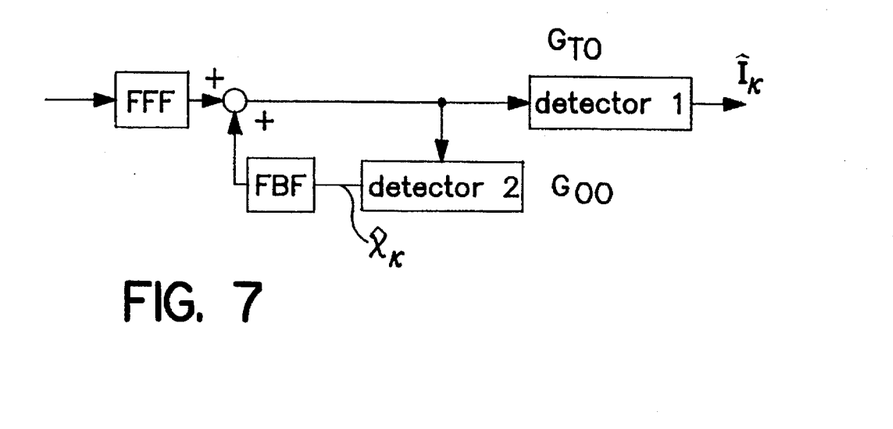
FIG. 7 is a block diagram of an equivalent model of a P/DFE/TCM-RSSE according to the present invention.

Now, let's examine the SEP performance of the detector of the present invention (further on called P/DFE/TCM-RSSE structure) and compare it to the tentative TCM-DFE scheme described by Chevillat and Elefiheriou. The P/DFE/TCM-RSSE structure in FIG. 3 can be modelled in FIG. 7 where detector 1 has the gain of $G_{TO}$ and detector 2 is assumed to have the gain of $G_{OO}$. Since detector 2 is included in the feedback loop, the gain $G_{OO}$ can significantly affect the overall performance of the DFE. Hence, the discussion was mainly focus on $G_{OO}$. Obviously, FIG. 7 degenerates to a conventional DFE when $G_{OO} = 0$ dB. In case of $G_{OO} \gg 0$, detector 2 guarantees that (1) the error rate of the feedback sequence to the DFE can be tremendously reduced and (2) the error takes place at time k does not strongly affect the decision at time k+1 because of the memory of the decision process. Therefore, error propagation seldom takes place in FIG. 7 when $G_{OO} \gg 0$. Taking this into account, the residual ISI contained in the signal input to detector 1 is assumed to be negligible and the noise components to be lid in the following discussions. Thus the errors in the sequence fed into the DFE mainly increase the variance of the noise at the input to detector 1. Let $$e_k = \{e_{k-1}, e_{k-2}, \ldots, e_{k-M2}\} \tag{46}$$

represent the error vector formed by the errors in the fed-back sequence, $$e_k = (x_k - \hat{x}_k) \in \{\Im_0, \Im_1, \ldots, \Im_{M-1}\} \tag{47}$$

The noise generated by the error vector is then given by $$U_{ek} = e_k b_k t \tag{48}$$

Consequently, the mean square error in the model of FIG. 7 can be further described by $$\equiv = E(\epsilon_k^2) = \equiv_{opt} + E\{u_k^2\} = \equiv_{opt} + \sum_{j=1}^{M_2} b_j^2 E\{e_k^2\} \tag{49}$$

where $\equiv_{opt}$ represents the MMSE produced by the model when $a_{opt}$ and $b_{opt}$ are applied. Eq (49) shows that the increase of $G_{OO}$ reduces $E\{e_k^2\}$ and the overall mean square error, -, at the input to detector 1. Since the error signal for the adaptive adjustment of $a_k$ and $b_k$ is given by $$\epsilon_k = \tilde{x}_k - \hat{x}_k \epsilon'_k - e_k \quad (50)$$

where $\epsilon'_k = x_k - \tilde{x}_k$ is the error signal in ideal DFE, conclusion from Eq (13), Eq (14) and Eq (50) may be drawn, that the reduction of errors including in the feedback sequence can decrease the variance of $\Delta a_k$ and $\Delta b_k$ in Eq (18) and Eq (19). Eq (49) and Eq (50) imply that $G_{OO}$ play an important role in the overall performance enhancement of FIG. 7.

Figure 8:
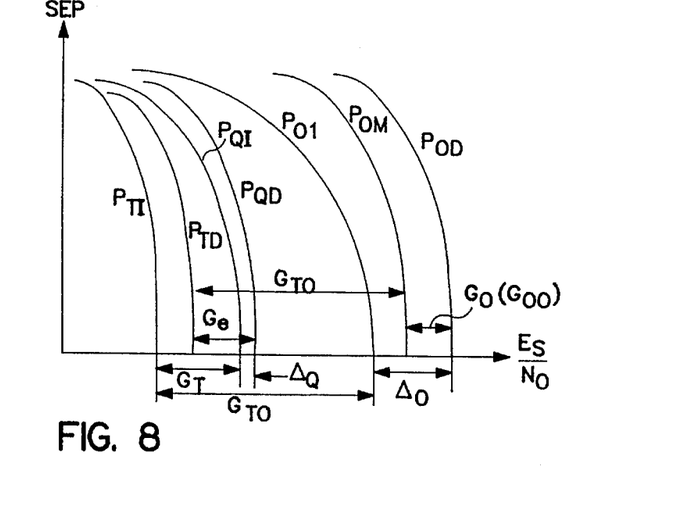
FIG. 8 is a graph illustrating the performances of a DFE compared to a P/DFE/TCM-RSSE according to the present invention.

Let $P_{OD}$ and $P_{OI}$ represent the SEPs achieved by the conventional DFE with uncoded 8PSK working in decision-direct mode and reference-direct model (ideal DFE), respectively, and $\Delta_0$ the SNR difference between $P_{OD}$ and $P_{OI}$ for a given SEP as shown in FIG. 8. Because of the existence of detector 2 in the feedback loop (FIG. 7), the SEP of the equalized signals at the input to detector 1, denoted by $P_{OM}$, must be located in between $P_{OI}$ and $P_{OD}$ when $G_{OO} > 0$ dB (FIG. 8).

Let $G_0(G_{OO})$ denote the effective gain achieved by the DFE in FIG. 7 over the conventional DFE working in decision-direct mode. $G_0(G_{OO})$ is then a function of $G_{OO}$ and satisfies $$G_0(G_{00}) = \begin{cases} 0 & \text{when } G_{00} = 0 \\ \Delta_0 & \text{when } G_{00} \geq \Delta_0 \end{cases} \quad (51)$$

$G_0(.)$ is a non-linear, monotone increasing function due to the fact that SEP exponentially increases with SNR. Unfortunately, it is extremely difficult to find out the expression of the function $G_0(G_{OO})$.

Denote the SEP obtained by the conventional DFE with QPSK signals in decision-direct mode by $P_{OD}$, the SEP achieved by the ideal DFE with QPSK signals by $P_{QI}$, the SEP obtained by the detector using an ideal DFE with TCM signals by $P_{TI}$, and the SEP achieved by the P/DFE/TCM-RSSE by $P_{TD}$, respectively. It can be found that the MMSE at the output of an ideal DFE is given by $$\Xi_{opt} = E\{\epsilon^2_k\} = 1 - \alpha^{*t} R^{-1} \alpha \quad (52)$$

Eq (20)–Eq (23) show the independence of $\Xi_{opt}$ from the constellation of transmitted signals. This indicates that ideal DFEs with uncoded QPSK or 8PSK signals achieve the same MMSE for a given channel. One can know that the ideal DFE with QPSK constantly saves SNR by about 5.3 dB than the ideal DFE with 8PSK, i.e. Eq. (44) also gives the SNR difference between $P_{QI}$ and $P_{OI}$ for a given SEP.

Let's define the effective gain achieved by the structure in FIG. 7 relatively to the conventional DFE with QPSK signals as $G_e$, and denote the SNR differences between the conventional DFE and the ideal DFE with QPSK signals by $\Delta_Q$ (FIG. 8). According to FIG. 8, there can obtain $$G_e = G_T \Delta_Q - \Delta G_0(G_{oo}) \quad (53)$$

where:

$$\Delta G_0(G_{00}, \Delta_0) = \begin{cases} \Delta_0 - G_0(G_{00}) & \text{when } G_0(G_{00}) \leq \Delta_0 \\ 0 & \text{elsewhere} \end{cases} \quad (54)$$

In Eq (53), $G_T + \Delta_Q$ gives the maximum effective gain that an ideal DFE with TCM signals can achieve relatively to the conventional DFE with uncoded signals while $\Delta G_0(G_{OO}, \Delta_0)$ represents the loss in the effective gain when the applied DFE is not ideal. Since $\Delta_Q$ and $\Delta_0$ are only determined by the channel, Eq (53) and Eq (54) imply that the effective gain achieved by the P/DFE/TCM-RSSE be mainly determined by $G_{OO}$ and $G_T$ for a given channel. The greater $G_{OO}$, the larger $G_e$ it is possible to have for a given TCM structure although Eq (53) and Eq (54) do not imply that TCM can always achieve a better performance than an uncoded modulation over a time-dispersive channel.

Let's now consider the scheme using DFE with TCM symbols fed back from the delay-free tentative decisions given by the conventional TCM detector. The dashed line in FIG. 5(c) shows that the SEP of the tentative delay-free decisions of the TCM symbols is mainly determined by the branch metric. Thus the SEP of the tentative decision can be written as $$P_{OT} = Q\left(\frac{\min\{|J_{20} - J_{22}|\}}{\sqrt{2N_0}}\right) \quad (55)$$

$$= Q\left(\frac{D_Q}{\sqrt{2N_0}}\right) = P_Q$$

Eq (39), Eq (40) and Eq (55) indicate that the gain, $G_{TO}$, of the delay-free tentative decisions over the uncoded 8PSK is the same as that achieved by the uncoded QPBK, i.e. $G_{TO} = G_{QO}$. Following FIG. 7 and Eq (55), $G_{OO}$ for the tentative TCM-DFE scheme can be expressed as $$G_{OO} = G_{QO} = 5.3 \text{ dB}. \quad (56)$$

Now, let's consider the special case of P/DFEFFCM-RSSE with $\sigma_k = S_k$ where P/DFEFFCM-RSSE becomes DFEFFCM. Since the symbols fed into the embedded DFE are from the output of the embedded TCM detector, following FIG. 5 and Eq (43), one can have:

$$G_{OO} = G_{TO} - 8.3 \text{ dB} > G'_{OO} \quad (57)$$

Assume $L=1$ and $\beta_L = 2$ in the embedded TCM-RSSE in FIG. 3. The super-trellis of the TCM-RSSE is illustrated in FIG. 9. The minimum Euclidean distance of the super-trellis is still determined by the parallel paths as shown in FIG. 9. Therefore, the super-trellis has the same minimum Euclidean distance as the original TCM shown in FIG. 5(b). However, in this TCM-RSSE based on the super-trellis, the effective energy of an input symbol increases to $$\left(1 + \sum_{j=1}^{L} b_{jk}^2\right) E_S$$

Hence, following Eq (43), one has $$\begin{aligned} G''_{OO} &= G_{TO} + 10\log\left(1 + \sum_{j=1}^{L} b_{jk}^2\right) \quad (58) \\ &= G_{TO} + 10\log(1 + b_{1k}^2) \geq G''_{OO} > G'_{OO} \end{aligned}$$

In general, some elements of $b_k$ are not negligible when the channel has great distortion. In such a case, Eq (58) shows that P/DFE/TCM-RSSE has better performance than DFE/TCM [Eq (57)]. However, L should be carefully chosen. Although a larger value of L leads to a larger effective symbol energy as shown in Eq (58) a larger L does not guarantee the TCM-RSSE still keeps the minimum Euclidean distance of the super-trellis as that given by the original TCM encoded. Moreover, a larger L implies the rapid increase in computation complexity of the embedded TCM-RSSE algorithm. Since $b_{1k} \neq 0$, Eq. (53)–Eq. (58) guarantee that following results can be held.

P/DFE/TCM/RSSE always gives the best SEP performance among the schemes of the tentative TCM-DFE, DFE/TCM and P/DFE/TCM-RSSS [Eq. (53), Eq. (54) and Sq. (58)].

When $G_O$ ($G_{OO}$)$\geq \Delta_O$ the performance of an ideal DFE with TCM signals can be achieved but Eq. (53) and Eq. (58) indicate that P/DFE/TCM-RSSE presents better convergence characteristics to the ideal performance than the tentative TCM-DFE since $G'''_{OO} > G'_{OO}$.

Since the predictor/equalizer unit in FIG. 3 has the same coefficients as those of the FFF of the embedded DFE, the complexity of the P/DFE/TCM-RSSE is almost the same as that of the tentative TCM-DFE.

Since the adjustment of the coefficients $a_k$ and $b_k$ in the proposed scheme is the same as in conventional DFEs the P/DFE/TCM-RSSE does not have any sacrifice in the stability of the adaptive algorithm unlike the pre-filtered MLSE schemes.

To confirm the analysis of the P/DFE/TCM-RSSE scheme, computer simulation was performed over two severe distorted channels. Channel 1 has a T-spaced impulse response as h(D)={0.407, 0.815, 0.407}. The T-spaced impulse response of Channel 2 is described by h(D)={0.227, 0.460, 0.688, 0.460, 0.227}. Channel 1 has a 60 dB spectrum-null at its band-edge while Channel 2 has a 60 dB in-band spectrum-null.

Both channel models are adopted from J. G. Proakis (Digital Communications, McGraw-Hill Inc., 1983). T/2-spaced DFE is employed in the P/DFE/TCM-RSSE with $M_1=32$ for its FFF and $M_2=10$ for its FBF. The step size µ of the gradien algorithm is chosen to be 0.002. To guarantee the accuracy of the simulation 50050 blocks of data, each having 100 data symbols, are used under a given SNR=$E_s/N_0$ while the first 50 blocks are used to train the detector. The P/DFE/TCM-RSSE works in decision-direct mode after the training. In all the simulation, 4s8p-TCM given by G. Ungerboeck (Channel coding with multi-level/phase signals, IEEE Trans. Inform. Theory, Vol. IT-28, pp. 55–67, Jan. 1982) is employed on the transmitting side.

Figure 10:
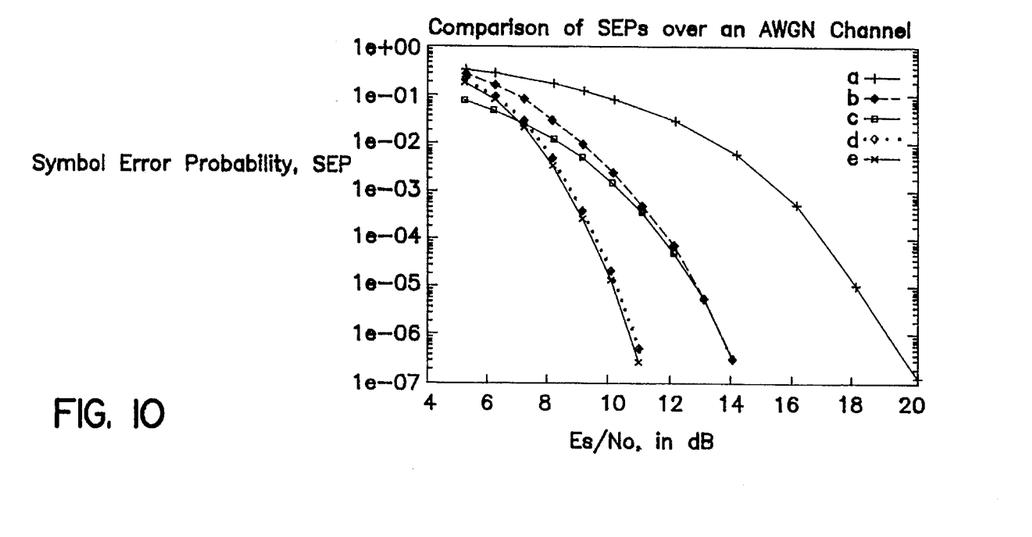
FIG. 10 is a graph showing simulation results of uncoded QPSK signals, 8PSK signals and TCM signals with delay-free tentative decision and delayed-decision over an additive white gaussian noise channel.

Simulation results are first carried out for uncoded QPSK, 8PSK signals and TCM signals with delay-free tentative decision and delayed-decision over an AWGN channel (FIG. 5). FIG. 10 shows the results, which exactly confirm the analysis made hereinbefore. In FIG. 10, "Curve a" represents the SEP of uncoded 8PSK signals, $P_O$, "Curve b" the SEP of the tentative detected TCM symbols, $P_{TO}$. About 5.3 dB is saved by "Curve b" compared with "Curve a". Comparing "Curve b" with "Curve c" which gives the SEP of uncoded QPSK signals, $P_Q$, allows to find that $P_{TO}$ and $P_Q$ are almost the same but there is a very small difference at the region of lower SNR. This difference is mainly due to the quasi-catastrophic error event. "Curve d" and "Curve e" give the SEPs of detected data, $P_{Op}$, and detected TCM symbols, $P_{Op}$, at the output of the TCM detector, respectively. Almost the same results of $P_{Qp}$ and $P_{Op}$ are achieved. It can be observed that "Curve d" saves about 3 dB relatively to "Curve b" and about 8.3 dB relatively to the uncoded 8PSK signals (Curve a").

To observe the improvement of the proposed P/DFE/TCM-RSSE scheme in SEP relatively to an uncoded modulation and other adaptive equalization schemes over time-dispersive channels, the simulation is also performed over Channel 1 and Channel 2.

Figure 11:
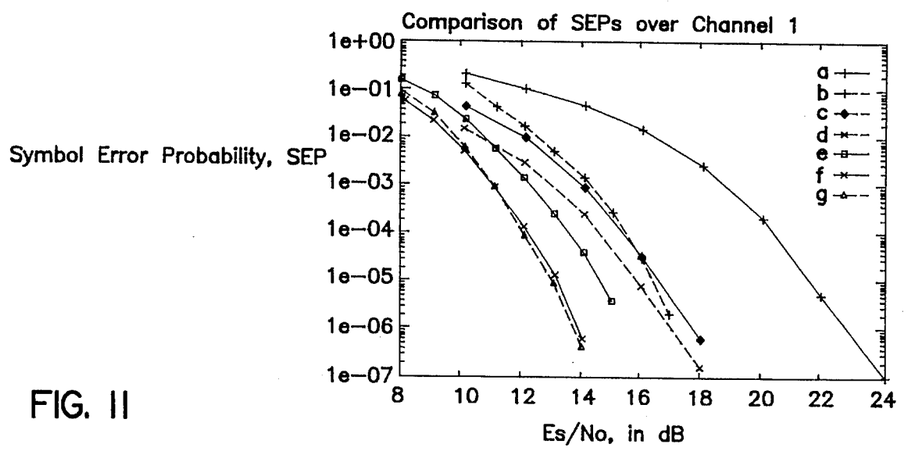
FIG. 11 is a graph showing simulation results of the signals of FIG. 10 over a channel 1.

FIG. 11 shows the SEPs of different schemes. As shown in the figure, "Curve a" describes the performance of a conventional ideal DFE with uncoded 8PSK signals. "Curve b" gives the performance of the tentative TCM-DFE. Here the same decision space as the 4s8p-TCM in the simulation of the tentative DFE scheme is used (this is called the case of full ISI-state truncation). "Curve c" and "Curve d" show the performance of a conventional DFE with uncoded QPSK signals in the decision-direct mode and reference-direct mode (i.e. ideal DFE), respectively. "Curve e" reflects the performance of the scheme with L=0 as discussed in this paper (namely, DFE/TCM). "Curve f" gives the performance of the proposed scheme P/DFE/TCM-RSSE with L=1 and $B_L=2$ (FIG. 9) while the ideal DFE performance with 4s8p-TCM signals are given by "Curve g". In the ideal case (i.e. in the reference-direct mode), ideal TCM ("Curve g") gains about 3 dB over uncoded QPSK ("Curve d"), which also reflects the gain given by 4s8p-TCM over an AWGN channel as shown in FIG. 10. This gain again confirms the conclusion in M. V. Eyuboglu (Detection of coded modulation signals on linear, severely distorted channels using decision-feedback noise prediction with interleaving, IEEE Trans. Commun., Vol COM-36, pp. 401–409, April 1988.). Comparing "Curve d" with "Curve a", one can find about 5.3 dB difference between the two curves. About 8.3 dB difference exists between "Curve g" and "Curve a". The simulation results in the ideal situation exactly match the analysis (FIG. 8) in the last section.

In practice, DFE always works in decision-direct mode. Hence, it is very important to observe the behaviour of the proposed P/DFE/TCM-RSSE with comparison of other DFEs to the non-ideal case with the same data transmission efficiency. Comparing "Curve e" with "Curve c", DFE/TCM can achieve about 2.3 dB gain over the conventional DFE with QPSK signals. It is very encouraging to find that about 3.8 dB improvement can be obtained by the proposed P/DFE/TCM-RSSE relatively to the conventional DFE ("Curve f" and "Curve c"). The performance achieved by the P/DFE/TCM-RSSE is almost the same as in the ideal DFE case ("Curve g"). However, in this case of Channel 1, the tentative TCM-DFE [17] can only gain very small over the conventional DFE at the region of sufficient high SNR as shown by "Curve b" and "Curve c".

Figure 12:
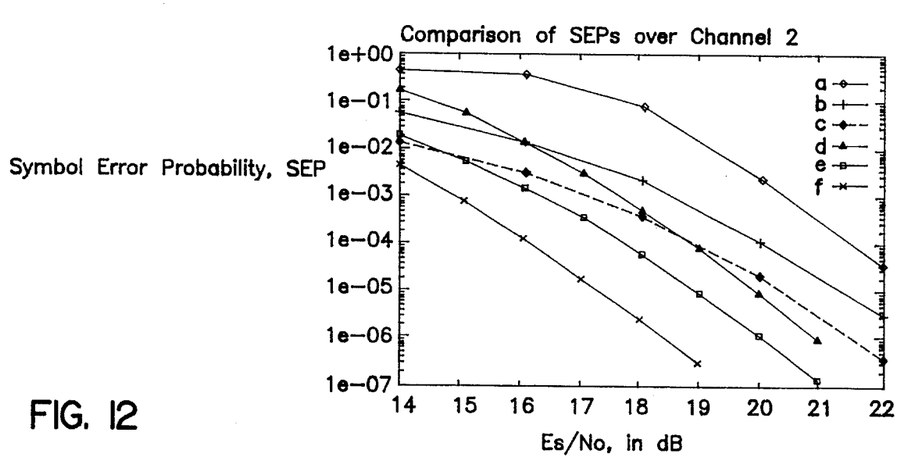
FIG. 12 is a graph showing simulation results of the signals of FIG. 10 over a channel 2.

FIG. 12 shows the SEPs of the schemes under discussion over Channel 2. Since Channel 2 has a 60 dB spectrum-null in its band the received symbols suffer from very severe ISI. On this channel, the conventional DFE with uncoded 8PSK signals cannot work stably in decision-direct mode because of the heavy effect of error propagation. Therefore, there is only shown the performance of the conventional DFE with uncoded QPSK signals in the decision-direct mode and reference-direct mode (ideal DFE) given by "Curve b" and "Curve c", respectively. In FIG. 12, "Curve a" gives the performance of the tentative TCM-DFE [17], "Curve d" and "Curve e" show the performance of the DFE/TCM and DFE/TCM-RSSE, respectively. The performance of the ideal DFE with TCM signals is given by "Curve f". A significant performance improvement is obtained again. "Curve e" and "Curve d" show that P/DFE/TCM-RSSE and DFE/TCM gain about 2.5 dB and 1.5 dB over the conventional DFE ("Curve b"), respectively. Since the severe distortion of Channel 2 the tentative TCM-DFE can no longer perform better than the conventional DFE. About 1.3 dB loss is observed through "Curve a" and "Curve b". As evaluated in the last section, "Curve f" and "Curve c" provide the maximum 3 dB gain, again, in the ideal feedback mode.

The performance of the proposed P/DFE/TCM-RSSE scheme in FIG. 11 and FIG. 12 was shown with comparison to DFEs for uncoded signals and to the tentative TCM-DFE scheme. It is observed, that the gain achieved by the adaptive scheme decreases with the distortion of the channels. Although these simulation results show that TCM does not always imply a better performance than an uncoded modulation scheme over a time-dispersive channel as it does over an AWGN channel, both figures indicate that the P/DFEF-FCM-RSSE proposed in this paper can always achieve significantly better performance than the tentative TCM-DFE. It is also obvious that the P/DFE/TCM-RSSE avoids from the long throughput delay associated with the adaptive schemes described in Eyuboglu and Zhou, Proakis and Ling, cited herein before, and has the same throughput delay as the conventional MLSE algorithm for TCM signals.

The proposed detector has been called P/DFE/TCM-RSSE. It consists of a predictor/equalizer unit prior to a reduced-state sequence estimator for TCM signals (TCM-RSSE) and an adaptive decision-feedback equalizer (DFE). Besides pre-equalizing the received signals, the predictor/equalizer unit also gives the TCM-RSSE predicted values of input signals so that the detected TCM symbols and the detected data are free from delay at the output of the TCM-RSSE. Consequently, the embedded DFE obtains feedback symbols directly from the output to the TCM-RSSE instead for those from a hard-decision maker as in the conventional DFE. In the proposed P/DFE/TCM-RSSE scheme, the DFE is the computation core. It supplies not only the embedded TCM-RSSE with the observed equivalent channel impulse response (ECIR) for the data detection but also the predictor/equalizer with necessary coefficients. In fact, the three parts of the detector, the predictor/equalizer, the DFE and the TCM-RSSE, are mutually inseparable and benefit each other. Since the characteristics of the high detection gain with memory detection property of the TCM-RSSE, the error propagation, which usually takes place in a DFE, is almost avoided in the proposed detector. In addition, the adaptive process of the proposed detector is the same as that of a conventional DFE so no loss in stability performance unlike the pre-filtered maximum likelihood sequence estimation (MLSE) schemes. The throughput delay of the detector is the same as that given by a conventional MLSE detector for TCM signals. Both analysis and computer simulation results have shown that the proposed detector has superior performance than other adaptive schemes especially when channels have severe distortions. In most cases, the ideal DFE performance for TCM signals over time-dispersive channels can be achieved. There was also shown in the paper that TCM does not always imply a better performance than an uncoded modulation over time-dispersive channels as it does over additive white Gaussian noise channels.

Although the present invention has been explained hereinabove by way of preferred embodiments thereof, it should be pointed out that any modifications to these preferred embodiments, within the scope of the appended claims, are not deemed to change or alter the nature and scope of the present invention.

What is claimed is:

1. A detector for demodulating a received signal and producing an information data signal with reduced intersymbol interference, the received signal having been previously encoded by a trellis coded modulator, the detector comprising:

a predictor means for producing a predicted signal and a first delayed signal from the received signal;

a delay line for delaying the first delayed signal and generating a second delayed signal accordingly;

a feedforward filter means for filtering the second delayed signal with respect to an updated vector signal a, and generating a filtered signal z accordingly;

an adder for adding the filtered signal z to a filtered signal v and generating a resulting filtered signal;

a subtracting means for subtracting the resulting filtered signal from an estimated symbol signal to obtain an error signal;

updating means for calculating the updated vector signal a and an updated vector signal b with respect to the error signal and an estimated vector signal x; and a trellis coded modulation estimating means corresponding to the trellis coded modulator, for generating the estimated symbol signal and the estimated vector signal x from the predicted signal, and for demodulating the predicted signal into said information data signal, the trellis coded modulator estimating means comprising a feedback filter means for filtering the estimated vector signal x with respect to the updated vector signal b and therefrom generating the filtered signal v, the feedback filter means being adjusted with respect to the feedforward filter means to form a decision-feedback equalizer.

2. The detector of claim 1, wherein the feedback filter means is embedded in the trellis coded modulation estimating means.

3. The detector of claim 1, wherein the feedforward filter means has a given structure, and the predictor means has a structure corresponding to the structure of the feedforward filter means.

4. The detector of claim 2, wherein the feedforward filter means has a given structure, and the predictor means has a structure corresponding to the structure of the feedforward filter means.

5. The detector of claim 1, wherein the predictor means is a predictor/equalizer means which also linearly equalizes the received signal before producing the predicted signal.

6. The detector of claim 2, wherein the predictor means is a predictor/equalizer means which also linearly equalizes the received signal before producing the predicted signal.

7. The detector of claim 3, wherein the predictor means is a predictor/equalizer means which also linearly equalizes the received signal before producing the predicted signal.

8. The detector of claim 5, wherein the predictor/equalizer means is a finite impulse response filter.

9. The detector of claim 6, wherein the predictor/equalizer means is a finite impulse response filter.

10. The detector of claim 7, wherein the predictor/equalizer means is a finite impulse response filter.

11. The detector of claim 1, wherein the delay line has a length adjusted according to an order of the feedforward filter means and a depth of the trellis coded modulation estimating means, to achieve a zero relative delay between the filtered signal z and the estimated vector signal and the estimated symbol signal.

12. The detector of claim 2, wherein the delay line has a length adjusted according to an order of the feedforward filter means and a depth of the trellis coded modulation estimating means, to achieve a zero relative delay between the filtered signal z and the estimated vector signal and the estimated symbol signal.

13. The detector of claim 3, wherein the delay line has a length adjusted according to an order of the feedforward filter means and a depth of the trellis coded modulation estimating means, to achieve a zero relative delay between the filtered signal z and the estimated vector signal and the estimated symbol signal.

14. The detector of claim 5, wherein the delay line has a length adjusted according to an order of the feedforward filter means and a depth of the trellis coded modulation estimating means, to achieve a zero relative delay between the filtered signal z and the estimated vector signal and the estimated symbol signal.

15. The detector of claim 1, wherein the trellis coded modulation estimating means is a trellis coded modulation reduced-state sequence estimator.

16. The detector of claim 14, wherein the trellis coded modulation estimating means is a trellis coded modulation reduced-state sequence estimator.

17. The detector of claim 1, wherein the updating means is a least means square algorithm or a recursive least square algorithm.

18. The detector of claim 16, wherein the updating means is a least means square algorithm or a recursive least square algorithm.

19. A detector for demodulating a received signal and producing an information data signal with reduced intersymbol interference, the received signal having been previously encoded by a trellis coded modulator, the detector comprising:

- a finite impulse response filter for linearly equalizing the received signal and producing a predicted signal and a first delayed signal from the received signal, said finite impulse response filter having a given structure;
- a delay line for delaying the first delayed signal and generating a second delayed signal accordingly, the delay line having a predetermined length;
- a feedforward filter means for filtering the second delayed signal with respect to an updated vector signal a, and generating a filtered signal z accordingly, the feedforward filter means having a structure corresponding to the structure of the finite impulse response filter, and a predetermined order;
- an adder for adding the filtered signal z to a filtered signal v and generating a resulting filtered signal;
- a subtracting means for subtracting the resulting filtered signal from an estimated symbol signal to obtain an error signal;
- updating means for calculating the updated vector signal a and an updated vector signal b with respect to the error signal and an estimated vector signal x, the updating means being a least square algorithm or a recursive least square algorithm; and
- a trellis coded modulation reduced-state sequence estimator corresponding to the trellis coded modulator, for generating the estimated symbol signal and the estimated vector signal x from the predicted signal, and for demodulating the predicted signal into said information data signal, the trellis coded modulation reduced-state sequence estimator comprising an embedded feedback filter means for filtering the estimated vector signal x with respect to the updated vector signal b and therefrom generating the filtered signal v and an equivalent channel impulse response for providing to the trellis coded modulation reduced-state sequence estimator, the feedback filter means being adjusted with respect to the feedforward filter means to form a decision-feedback equalizer, the trellis coded modulation reduced-state sequence estimator having a predetermined depth,
- wherein the predetermined length of the delay line is adjusted according to the order of the feedforward filter means and the depth of the trellis coded modulation reduced-state sequence estimator, to achieve a zero relative delay between the filtered signal z and the estimated vector signal and the estimated symbol signal.

* * * * *